(12) United States Patent
Walter et al.

(10) Patent No.: US 9,452,928 B2
(45) Date of Patent: Sep. 27, 2016

(54) OPTO-ELECTRONIC CIRCUITS AND TECHNIQUES

(75) Inventors: Gabriel Walter, Madison, WI (US); Poh Lian Lam, Melaka (MY)

(73) Assignee: Quantum Electro Opto Systems Sden. Bhd., Melaka (MY)

( * ) Notice: Subject to any disclaimer, the term of this patent is extended or adjusted under 35 U.S.C. 154(b) by 684 days.

(21) Appl. No.: 13/573,237

(22) Filed: Aug. 31, 2012

(65) Prior Publication Data

US 2013/0071128 A1    Mar. 21, 2013

Related U.S. Application Data

(60) Provisional application No. 61/573,316, filed on Sep. 2, 2011.

(51) Int. Cl.
| | | |
|---|---|---|
| H04B 10/12 | (2006.01) | |
| H04B 10/00 | (2013.01) | |
| B82Y 20/00 | (2011.01) | |

(52) U.S. Cl.
CPC ..................................... B82Y 20/00 (2013.01)

(58) Field of Classification Search
CPC ....... H01L 33/00; H01L 33/04; H04B 10/00; H04B 10/12; H04B 10/25; H04B 10/25137
USPC .......................................... 398/141, 164, 195
See application file for complete search history.

(56) References Cited

U.S. PATENT DOCUMENTS

| | | | |
|---|---|---|---|
| 4,031,321 A | 6/1977 | Bakgaard | 179/1 D |
| 4,176,367 A | 11/1979 | Uematsu | 357/19 |
| 4,580,293 A | 4/1986 | Reichle | 455/609 |
| 4,710,936 A | 12/1987 | Shibata et al. | 372/45 |
| 5,089,787 A | 2/1992 | Wang et al. | 330/4.9 |
| 5,796,714 A | 8/1998 | Chino et al. | 372/50 |
| 6,479,844 B2 | 11/2002 | Taylor | 257/192 |
| 6,727,530 B1 | 4/2004 | Feng et al. | 257/184 |

(Continued)

FOREIGN PATENT DOCUMENTS

| | | |
|---|---|---|
| EP | 0477 952 | 4/1992 |
| JP | 61270885 | 12/1986 |
| WO | WO 88/01813 | 3/1999 |

OTHER PUBLICATIONS

G. Walter, Tilted Charge High Speed (7 Ghz) light emitting diode, 2009, Applied Physics Letters 94.*

(Continued)

*Primary Examiner* — David Payne
*Assistant Examiner* — Pranesh Barua
(74) *Attorney, Agent, or Firm* — Martin Novack

(57) ABSTRACT

A hybrid circuit for producing optical signals in response to electrical energizing signals, including: a tilted charge light-emitting device having an electrical input port and an optical output port, the device having an optical output response which is a function of input frequency; and an input interface circuit coupled with the electrical input port of the device, and having a transfer function substantially proportional to an inverse of the optical output response of the device; whereby application of the electrical energizing signals to the input interface circuit is operative to produce optical signals from the output optical port of the device. The input interface circuit includes a passive RLC circuit having a transfer function characterized by a region of increasing amplitude versus frequency.

22 Claims, 7 Drawing Sheets

(56) References Cited

U.S. PATENT DOCUMENTS

| | | | |
|---|---|---|---|
| 6,728,494 B2 | 4/2004 | Numata et al. | 398/182 |
| 6,853,150 B2* | 2/2005 | Clauberg | H05B 33/0818 315/185 R |
| 6,974,969 B2 | 12/2005 | Taylor | 257/24 |
| 7,043,161 B2* | 5/2006 | Jung | H04B 10/25 398/139 |
| 7,091,082 B2 | 8/2006 | Feng | 438/235 |
| 7,247,892 B2 | 7/2007 | Taylor | 257/197 |
| 7,280,769 B2 | 10/2007 | Astrauskas | 398/202 |
| 7,286,583 B2 | 10/2007 | Feng et al. | 372/30 |
| 7,354,780 B2 | 4/2008 | Feng et al. | 257/292 |
| 7,535,034 B2* | 5/2009 | Walter | H01L 33/04 257/13 |
| 7,680,420 B1* | 3/2010 | Walker | H04B 10/25137 398/183 |
| 7,711,015 B2 | 5/2010 | Holonyak et al. | 372/11 |
| 7,813,396 B2 | 10/2010 | Feng et al. | 372/43.01 |
| 7,998,807 B2 | 8/2011 | Feng et al. | 438/235 |
| 2001/0050934 A1 | 12/2001 | Choquette et al. | 372/43 |
| 2004/0091270 A1 | 5/2004 | Choi et al. | 398/130 |
| 2005/0040387 A1 | 2/2005 | Feng et al. | 257/14 |
| 2005/0040432 A1 | 2/2005 | Feng et al. | 257/198 |
| 2005/0054172 A1 | 3/2005 | Feng | 438/313 |
| 2006/0093010 A1 | 5/2006 | Sekiya et al. | 372/99 |
| 2007/0065160 A1 | 3/2007 | Shinohara | 398/182 |
| 2008/0089368 A1 | 4/2008 | Feng et al. | 372/25 |
| 2008/0205461 A1 | 8/2008 | Henrichs | 372/29.023 |
| 2008/0240173 A1 | 10/2008 | Holonyak et al. | 372/9 |
| 2009/0134939 A1 | 5/2009 | Feng et al. | 327/581 |
| 2009/0315468 A1* | 12/2009 | Wu | H05B 33/0815 315/186 |
| 2010/0034228 A1 | 2/2010 | Holonyak et al. | 374/45 |
| 2010/0039842 A1* | 2/2010 | Liu | H05B 33/0809 363/126 |
| 2010/0073086 A1 | 3/2010 | Holonyak et al. | 330/149 |
| 2010/0098374 A1* | 4/2010 | Althaus | G02B 6/4214 385/14 |
| 2010/0103971 A1 | 4/2010 | Then et al. | 372/45.01 |
| 2010/0202483 A1 | 8/2010 | Walter et al. | 372/45.01 |
| 2010/0202484 A1 | 8/2010 | Holonyak et al. | 372/45.01 |
| 2010/0272140 A1 | 10/2010 | Walter et al. | 372/38.02 |
| 2010/0277144 A1* | 11/2010 | Wang | H05B 33/0818 323/282 |
| 2010/0289427 A1 | 11/2010 | Walter et al. | 315/219 |
| 2010/0315018 A1 | 12/2010 | Then et al. | 315/291 |
| 2011/0068713 A1* | 3/2011 | Hoogzaad | H05B 33/0815 315/307 |
| 2011/0150487 A1 | 6/2011 | Walter | 398/115 |
| 2011/0291582 A1* | 12/2011 | Wei | H05B 33/0821 315/254 |
| 2012/0068151 A1 | 3/2012 | Walter | 257/9 |
| 2012/0153854 A1* | 6/2012 | Setomoto | H05B 33/0815 315/200 R |
| 2012/0170938 A1* | 7/2012 | Evans | H04B 10/073 398/91 |
| 2014/0023376 A1* | 1/2014 | Walter | H04B 10/2504 398/115 |

OTHER PUBLICATIONS

Microwave Circuit Model of the Three-Port Transistor Laser, H.W. Then, M. Feng, and N. Holonyak, Jr., Journal of Applied Physics, vol. 107, No. 9, May 10, 2010.

Ledistor—A Three Terminal Double Heterostructure Optoelectronic Switch, G.W. Taylor et al., Appl. Phys. Lett. 50, 6 (1987).

Light-Emitting Transistor: Light Emission From InGaP/GaAs Heterojunction Bipolar Transistors, M. Feng, N. Holonyak, Jr., and W. Hafez, Appl. Phys. Lett. 84, 151 (2004).

Quantum-Well-Base Heterojunction Bipolar Light-Emitting Transistor, M. Feng, N. Holonyak, Jr., and R. Chan, Appl. Phys. Lett. 84, 1952 (2004).

Type-II GaAsSb/InP Heterojunction Bipolar Light-Emitting Transistor, M. Feng, N. Holonyak, Jr., B. Chu-Kung, G. Walter, and R. Chan, Appl. Phys. Lett. 84, 4792 (2004).

Laser Operation of a Heterojunction Bipolar Light-Emitting Transistor, G. Walter, N. Holonyak, Jr., M. Feng, and R. Chan, Appl. Phys. Lett. 85, 4768 (2004).

Microwave Operation and Modulation of a Transistor Laser, R. Chan, M. Feng, N. Holonyak, Jr., and G. Walter, Appl. Phys. Lett. 86, 131114 (2005).

Room Temperature Continuous Wave Operation of a Heterojunction Bipolar Transistor Laser, M. Feng, N. Holonyak, Jr., G. Walter, and R. Chan, Appl. Phys. Lett. 87, 131103 (2005).

Visible Spectrum Light-Emitting Transistors, F. Dixon, R. Chan, G. Walter, N. Holonyak, Jr., M. Feng, X. B. Zhang, J. H. Ryou, and R. D. Dupuis, Appl. Phys. Lett. 88, 012108 (2006).

The Transistor Laser, N. Holonyak, M Feng, Spectrum, IEEE vol. 43, Issue 2, Feb. 2006.

Signal Mixing in a Multiple Input Transistor Laser Near Threshold, M. Feng, N. Holonyak, Jr., R. Chan, A. James, and G. Walter, Appl. Phys. Lett. 88, 063509 (2006).

Collector Current Map of Gain and Stimulated Recombination on the Base Quantum Well Transitions of a Transistor Laser, R. Chan, N. Holonyak, Jr., A. James, G. Walter, Appl. Phys. Lett. 88, 143508 (2006).

Collector Breakdown in the Heterojunction Bipolar Transistor laser, G. Walter, A. James, N. Holonyak, Jr., M. Feng, and R. Chan, Appl. Physics Lett. 88, 232105 (2006).

High-Speed (≥1 GHz) Electrical and Optical Adding, Mixing, and Processing of Square-Wave Signals With a Transistor Laser, M. Feng, N. Holonyak, Jr., R. Chan, A. James, and G. Walter, IEEE Photonics Technology Lett., vol. 18, No. 11, Jun. 1, 2006.

Graded-Base InGaN/GaN Heterojunction Bipolar Light-Emitting Transistors, B.F. Chu-Kung, M. Feng, G. Walter, and J. Holonyak, Jr. et al., Appl. Physics Lett. 89, 082108 (2006).

Carrier Lifetime and Modulation Bandwidth of a Quantum Well AlGaAs/InGaP/GaAs/InGaAs Transistor Laser, M. Feng, N. Holonyak, Jr., A. James, K. Cimino, G. Walter, and R. Chan, Appl. Phys. Lett 89, 113504 (2006).

Chirp in a Transistor Laser: Franz-Keldysh Reduction of the Linewidth Enhancement, G. Walter, A. James, N. Holonyak, Jr., and M. Feng, App. Phys. Lett. 90, 091109 (2007).

Photon-Assisted Breakdown, Negative Resistance, and Switching in a Quantum-Well Transistor Laser, A. James, G. Walter, M. Feng, and N. Holonyak, Jr., Appl. Phys. Lett. 90, 152109 (2007).

Franz-Keldysh Photon-Assisted Voltage-Operated Switching of a Transistor Laser, A. James, N. Holonyak, M. Feng, and G. Walter, Photonics Technology Letters, IEEE vol. 19 Issue: 9 (2007).

Experimental Determination of the Effective Minority Carrier Lifetime in the Operation of a Quantum-Well n-p-n. Heterojunction Bipolar Light-Emitting Transistor of Varying Base Quantum-Well Design and Doping; H.W. Then, M. Feng, N. Holonyak, Jr., and C. H. Wu, Appl. Phys. Lett. 91, 033505 (2007).

Charge Control Analysis of Transistor Laser Operation, M. Feng, N. Holonyak, Jr., H. W. Then, and G. Walter, Appl. Phys. Lett. 91, 053501 (2007).

Optical Bandwidth Enhancement by Operation and Modulation of the First Excited State of a Transistor Laser, H. W. Then, M. Feng, and N. Holonyak, Jr., Appl. Phys. Lett. 91, 183505 (2007).

Modulation of High Current Gain (β>49) Light-Emitting InGaN/GaN Heterojunction Bipolar Transistors, B. F. Chu-Kung, C. H. Wu, G. Walter, M. Feng, N. Holonyak, Jr., T. Chung, J.-H. Ryou, and R. D. Dupuis, Appl. Phys. Lett. 91, 232114 (2007).

Collector Characteristics and the Differential Optical Gain of a Quantum-Well Transistor Laser, H. W. Then, G. Walter, M. Feng, and N. Holonyak, Jr., Appl. Phys. Lett. 91, 243508 (2007).

InAlGaAs/InP Light-Emitting Transistors Operating Near 1.55 μm, Yound Huang, Xue-Bing Zhang, Jae-Hyun Ryun, Russell D. Dupuis, Forest Dixon, Nick Holonyak, Jr., and Milton Feng., J. Appl. Phys. 103 114505 (2008).

Transistor Laser With Emission Wavelength at 1544 nm, F. Dixon, M. Feng, N. Holonyak, Jr., Yong Huang, X. B. Zhang, J. H. Ryou, and R. D. Dupuis, Appl. Phys. Lett. 93, 021111 (2008).

Optical Bandwidth Enhancement of Heterojunction Bipolar Transistor Laser Operation With an Auxiliary Base Signal, H.W. Then, G. Walter, M. Feng, and N. Holonyak, Jr., Appl. Phys. Lett. 93, 163504 (2008).

(56) References Cited

OTHER PUBLICATIONS

Bandwidth Extension by Trade-Off of Electrical and Optical Gain in a Transistor Laser: Three-Terminal Control, H. W. Then, M. Feng, and N. Holonyak, Jr., Appl. Phys. Lett. 94, 013509 (2009).
Tunnel Junction Transistor Laser, M. Feng, N. Holonyak, Jr., H. W. Then, C. H. Wu, and G. Walter, Appl. Phys. Lett. 94, 041118 (2009).
Electrical-Optical Signal Mixing and Multiplication (2 → 22 GHz) With a Tunnel Junction Transistor Laser, H.W. Then, C.H. Wu, G. Walter, M. Feng and N. Holonyak, Jr., Appl. Phys. Lett. 94, 10114 (2009).
Scaling of Light Emitting Transistor for Multigigahertz Optical Bandwidth, C.H. Wu, G. Walter, H.W. Then, M. Feng and N. Holonyak, Jr., Appl. Phys. Lett. 94, 171101 (2009).
Device Performance of Light Emitting Transistors With C-Doped and Zn-Doped Base Layers, Y. Huang, J.-H. Ryou, R.D. Dupuis, F. Dixon, N. Holonyak, Jr., and M. Feng, IPRM '09 IEEE Intl. Conf. May 10-14, 2009.
Tilted-Charge High Speed (7 GHz) Light Emitting Diode, G. Walter, C. H. Wu, H. W. Then, M. Feng, and N. Holonyak, Jr., Appl. Phys. Lett. 94, 231125 (2009).
4.3 GHz Optical Bandwidth Light Emitting Transistor, G. Walter, C. H. Wu, H. W. Then, M. Feng, and N. Holonyak, Jr., Appl. Phys. Lett. 94, 241101 (2009).
Resonance-Free Frequency Response of a Semiconductor Laser, M. Feng, H. W. Then, N. Holonyak, Jr., G. Walter, and A. James, Appl. Phys. Lett. 95, 033509 (2009).
4-GHz Modulation Bandwidth of Integrated 2×2 LED Array, Chao-Hsin Wu; Walter, G.; Han Wui Then; Feng, M.; Holonyak, N.; Photonics Technology Letters, IEEE vol. 21, Issue: 24 (2009).
Physics of Base Charge Dynamics in the Three Port Transistor Laser, H. W. Then, M. Feng, and N. Holonyak, Appl. Phys. Lett. 96, 113509 (2010).
Microwave Circuit Model of the Three-Port Transistor Laser, H. W. Then, M. Feng, and N. Holonyak, J. Appl. Phys. 107, 094509 (2010).
Distributed Feedback Transistor Laser, F. Dixon, M. Feng, and N. Holonyak, Appl. Phys. Lett. 96, 241103 (2010).
Stochastic Base Doping and Quantum-Well Enhancement of Recombination in an n-p-n. Light-Emitting Transistor or Transistor Laser, H. W. Then, C. H. Wu, M. Feng, N. Holonyak, and G. Walter, Appl. Phys. Lett. 96, 263505 (2010).
Design and Operation of Distributed Feedback Transistor Lasers, F. Dixon, M. Feng, and N. Holonyak, Jr. , Journal of Appl. Physics 108, 093109 (2010).
Temperature Dependence of a High-Performance Narrow-Stripe (1 μm) Single Quantum-Well Transistor Laser, M. Feng, N. Holonyak, Jr. and A. James, Appl. Physics Letters 98, 051107 (2011).
InP/InAlGaAs Light-Emitting Transistors and Transistor Lasers With a Carbon-Doped Base Layer, Yong Huang, Jae-Hyun Ryou, Russell Dupuis, Forest Dixon, Milton Feng, and Nick Holonyak, Jr., Journal of Appl. Physics 109, 063106 (2011).
Bandfilling and Photon-Assisted Tunneling in a Quantum-Well Transistor Laser, M. Feng, R. Bambery, and N. Holonyak, Jr., Appl. Physics Letters 98, 123505 (2011).

* cited by examiner

OPTO-ELECTRONIC CIRCUITS AND TECHNIQUES

PRIORITY CLAIM

Priority is claimed from U.S. Provisional Patent Application No. 61/573,316, filed Sep. 2, 2011, and said Provisional Patent Application is incorporated herein by reference.

FIELD OF THE INVENTION

This invention relates to the field of semiconductor light emitting devices and to circuits and methods incorporating such devices.

BACKGROUND OF THE INVENTION

Included in the background of the present invention are technologies relating to heterojunction bipolar transistors (HBTs, which are electrical titled charge devices) and light-emitting transistors, transistor lasers, and titled charge light-emitting diodes (respectively, LETs, TLs, and TCLEDs, all of which are optical tilted charge devices). A tilted charge device gets its name from the energy diagram characteristic in the device's base region, which has, approximately, a descending ramp shape from the emitter interface to the collector (or drain, for a two terminal device) interface. This represents a tilted charge population of carriers that are in dynamic flow—"fast" carriers recombine, and "slow" carriers exit via the collector (or drain).

Regarding optical tilted charge devices and techniques, which typically employ one or more quantum size regions in the device's base region, reference can be made, for example, to U.S. Pat. Nos. 7,091,082, 7,286,583, 7,354,780, 7,535,034, 7,693,195, 7,696,536, 7,711,015, 7,813,396, 7,888,199, 7,888,625, 7,953,133, 7,998,807, 8,005,124, 8,179,937, and 8,179,939; U.S. Patent Application Publication Numbers US2005/0040432, US2005/0054172, US2008/0240173, US2009/0134939, US2010/0034228, US2010/0202483, US2010/0202484, US2010/0272140, US2010/0289427, US2011/0150487, and US2012/0068151; and to PCT International Patent Publication Numbers WO/2005/020287 and WO/2006/093883 as well as to the publications referenced in U.S. Patent Application Publication Number US2012/0068151.

An optical tilted charge device includes an active region with built-in free majority carriers of one polarity, where into one input to this active region, a single species of minority carriers of another polarity are injected and allowed to diffuse across the active region. This active region has features that enable and enhance the conduction of majority carriers and the radiative recombination of minority carriers. On the output side of the region, minority carriers are then collected, drained, depleted or recombined by a separate and faster mechanism. Electrical contacts are coupled to this full-featured region.

In early 2004, a publication described an optical tilted charge device incorporating a quantum well in the base region of the device in order to enhance radiative recombination (see M. Feng, N. Holonyak Jr., and R. Chan, Quantum-Well-Base Heterojunction Bipolar Light-Emitting Transistor, Appl. Phys. Lett. 84, 1952, 2004). In that paper, it was demonstrated that the optical signal followed the sinusoidal electrical input signal at speeds of up to 1 GHz. More than five years later, after further work and fundamental developments (relating, among other developments, to operation methods, active area design, and epilayer structure), it was reported that high speed tilted charge devices as spontaneous emission light emitters, operated at bandwidths of 4.3 GHz (LET) and later at 7 GHz (TCLED). (See G. Walter, C. H. Wu, H. W. Then, M. Feng, and N. Holonyak Jr., Titled-Charge High Speed (7 GHz) Light Emitting Diode, Appl. Phys. Lett. 94, 231125, 2009.) Further improvements have been achieved since that time, but additional advances in efficiency and bandwidth are desirable for achieving commercially practical opto-electronic devices and techniques.

It is among the objections hereof to achieve such advances and improvements in optical tilted charge devices, circuits, and techniques.

SUMMARY OF THE INVENTION

The challenge of achieving an efficient high-speed optical tilted charge device has been found to involve unexpected subtleties. For example, an approach of making the device area smaller and narrower to result in smaller resistances (R), smaller capacitances (C) and smaller inductances (L) is not necessarily beneficial. In a related vein, merely employing design rules of the fastest HBT devices (e.g. InGaP/GaAs HBTs) is insufficient. Despite their common origin from transistor technology, optical tilted charge devices share little common design traits with the high speed HBT transistor (an electrical tilted charge device). For example, the addition of a quantum well in the base of a transistor, does not merely introduce another element or defect to assist in recombination, but also a structure which is capable of storing charge, lateral transport, and re-thermalizing captured carriers. Furthermore, with significantly lower electrical gain (higher base current ratios), problems associated with base sheet resistance (heating, emitter crowding) and base current densities (reliability) are amplified and the importance of base transit time, a big issue in design of HBT's, is dwarfed by concerns of lateral resistance and emitter crowding at low emitter current densities.

When designing a high speed optical tilted charge device, optical extraction, beam shape and optical power output are as important as the electrical gain and electrical bandwidth of the device. Even the design rules which the HBT community have so faithfully followed, in that the speed of a HBT can be increased by continuously shrinking the dimensions of the base-emitter junction and base collector junction, cannot be utilized since this physical dimensional reduction results in increasingly smaller radiative recombination efficiency. Therefore, such design rules are suitable for a purely electrical input/output tilted charge device but not for a design which requires also the optimization of optical output (optical tilted charge device).

Likewise, the high speed optical tilted charge device shares little common design traits with charge storage light emitters (such as diode lasers or light emitting diodes). For example, although both use structures such as quantum wells, the design rules of an optical charge storage device necessitate methods of maximizing confinement or storage of carriers (in order to improve the probability of stimulated emission process where captured carriers "wait" to be stimulated by a photon field or recombine by spontaneous emission), whereas the design rules of an optical tilted charge device necessitate methods for minimizing stored carriers (to achieve high speed operation). Even design rules for light extraction used in charge storage devices do not necessarily apply to tilted charge devices due to design constraints (e.g. physical dimensions, applications, power consumption, bandwidth and cost) imposed on the tilted charge devices.

One design consideration relates to cost. As the applications of optical interconnects reach shorter and shorter ranges, the cost associated with electrical-to-optical conversion needs to be reduced. The high speed optical tilted charge device (HS-OTCD) is not only a replacement for VCSEL or diode laser based electro-optical approaches, but also for the much cheaper traditional copper interconnects where there is no need for electro-optical conversion. Therefore, designs that improve speed characteristics should ideally not increase cost.

Another design consideration relates to power consumption. The density and the number of high speed interconnects continues to increase for newer applications. Low power consumption is a serious design consideration in order to reduce the associated cooling cost and also to simplify the design architecture. A reference measurement matrix known as the power-to-bandwidth ratio, $r_{pb}$, is used to indicate the device power efficiency, where a lower value indicates a more power efficient device.

$$r_{pb} = \frac{\text{Overall Power Consumption}}{\text{Optical 3 dB Bandwidth}}$$

A further design consideration relates to radiative quantum efficiency. For an optical tilted charge device with a given epilayer design and device dimensions, the maximum optical internal quantum efficiency is achieved when operated at the lowest current densities. The quantum efficiency values can be derived from the slope of the light (L) versus recombination current ($I_R$) curve. In FIG. 1, there is shown for example the non-linear light output characteristic of a three terminal optical tilted charge device (light emitting transistor) with an active emitter mesa region of approximately 20 um by 4 um as a function of recombination current. As the $I_R$ increases, the slope of the curve decreases, indicating that less light is generated per unit recombination current. The slope of L-$I_R$ curve at the bias point, $I_R$~0 mA represents a reference point for the highest internal quantum efficiency achievable by this specific device design. Subsequent changes in internal quantum efficiency (slope) at higher $I_R$ bias can then be normalized and referenced to this initial state slope, in order to generate the normalized internal quantum efficiency, $\eta_{nqe}$, curve of the HS-OTCD. FIG. 2 shows the normalized internal quantum efficiency as a function of recombination. For this particular device, it would be desirable to operate the device at ~$I_R$=2 mA ($\eta_{nqe}$~70%).

A still further design consideration relates to operating AC voltage. For most applications and standards (Ethernet, fiber channel, Infiniband), a minimum peak-to-peak signal voltage of 0.5 volts (Vpp) and a maximum 1 Vpp is supplied on each single ended differential line. If the device is designed with a typical input impedance of 50 ohms, the 0.5 Vpp is capable of driving at least 10 mA of peak-to-peak current.

Still another design consideration relates to bandwidth. The minimum HS-OTCD bandwidth should ideally be at least 50% of the data rate. Thus, for example, a 10 Gbps data rate, would requires the HS-OTCD to have a minimum optical operating bandwidth of at least 5 GHz. However, as treated above, existing approaches to increasing the bandwidth of a HS-OTCD depend on reducing dimensions and increasing the operating current densities, which tend to be adverse to the design consideration of maximizing radiative quantum efficiency, as has been explained. Accordingly, a feature hereof involves techniques for substantially increasing operating optical bandwidth without violating other listed design considerations.

In accordance with a feature of the invention, there are set forth techniques for operation of power efficient high speed optical tilted charge devices (HS-OTCDs). Using these techniques, the operating bandwidth (optical 3 dB bandwidth) of a HS-OTCD can be improved by about an order of magnitude, the emitter current densities and power consumption to bandwidth ratios are kept relatively low (e.g. <20,000 A/cm$^2$ and <3 mW/GHz) and normalized quantum efficiencies, $\eta_{nqe}$, are kept high (e.g. >60%).

In accordance with a form of the invention, there is provided a hybrid circuit for producing optical signals in response to electrical energizing signals, comprising: a tilted charge light-emitting device having an electrical input port and an optical output port, said device having an optical output response which is a function of input frequency; and an input interface circuit coupled with the electrical input port of said device, and having a transfer function substantially proportional to an inverse of the optical output response of said device; whereby application of said electrical energizing signals to said input interface circuit is operative to produce optical signals from the output optical port of said device. In an embodiment of this form of the invention, the input interface circuit comprises a passive RLC circuit having a transfer function characterized by a region of increasing amplitude versus frequency. In this embodiment, there is further provided an integrated circuit medium, and said tilted charge light-emitting device and said input interface circuit are disposed on said medium. The tilted charge light-emitting device can comprise, for example, a light-emitting transistor or a tilted charge light-emitting diode.

In accordance with another form of the invention, a method is provided for producing optical signals in response to electrical energizing signals, including the following steps: providing a tilted charge light-emitting device having an electrical input port and an optical output port; determining the optical output response of said device as a function of input frequency; providing an input interface circuit, coupled with said electrical input port, having a transfer function inversely proportional to said determined response; and applying said electrical energizing signals to said device via said input interface circuit to produce said output optical signals. In an embodiment of this form of the invention, the step of providing an input interface comprises providing an RLC circuit with a series LC branch that is operative to implement a phase shift to said electrical energizing signals. In this embodiment, said electrical energizing signals comprise AC signals having an excess input voltage peak-to-peak amplitude, and said input interface circuit is operative to use a substantial portion of said excess input voltage.

In another form of the invention, a method is set forth for establishing a high bandwidth communication link between a first location and a second location, including the following steps: providing, at said first location, electrical energizing signals representative of data to be communicated; providing a tilted charge light emitting device having at least one electrical input port and an optical output port; coupling the optical output port of said titled charge light-emitting device to an optical waveguide; providing, at said second location, a receiver circuit that includes a photodetector coupled with said optical waveguide; said tilted charge light-emitting device, said optical waveguide, and said receiver circuit each having an intrinsic transfer function as a function of frequency; and providing an input interface circuit coupling said electrical energizing signal to said tilted charge light-emitting device, said input interface circuit having a frequency dependent transfer function that is determined using a product of the transfer functions of said tilted charge light-emitting device and at least one of said optical waveguide and said receiver circuit. In an embodiment of this form of the invention, said step of providing a tilted charge light-emitting device comprises providing a device that produces spontaneous light emission from its optical output port. Also in this embodiment, said step of providing electrical energizing signals includes providing a transmitter that transmits said electrical energizing signals via a transmission line having an intrinsic transfer function as a function of frequency, and said step of providing an input interface circuit coupling said electrical energizing signal to said tilted charge light-emitting device comprises providing said input interface circuit as having a frequency dependent transfer function that is determined using a product of the transfer functions of said transmission line, said tilted charge light-emitting device, said optical waveguide, and said receiver circuit.

Further features and advantages of the invention will become more readily apparent from the following detailed description when taken in conjunction with the accompanying drawings.

BRIEF DESCRIPTION OF THE DRAWINGS

FIG. 5 includes FIGS. 5A and 5B.

DETAILED DESCRIPTION

Generally, standards for peak-to-peak input voltage, Vpp, to semiconductor light emitters is a minimum of 0.5 Volts. The high speed optical tilted charge device (HS-OTSD) hereof is designed to operate with a Vpp signal that is substantially less than the standard minimum Vpp signal of 0.5 V. The net difference between the smaller required operating Vpp signal and standard minimum Vpp signal, results in the existence of an excess supply voltage (excess energy). This can be accomplished, for example, by operating the device under common emitter mode with an input load of 50 ohms. Then, the device is designed so that a peak-to-peak (RF) base recombination current, Ipp, of about ~2 mA or less is required for the optical application. For example, for a device operating at 980 nm, and 100% internal quantum efficiency, each mA of recombination current could generate ~1.26 mW of optical power, which is adequate for most high speed applications. With about 2 mA of recombination current, 50 ohm input load, and in common emitter mode, the required Vpp supply is only ~0.1 V. This results in an excess supply voltage of 0.4 V, based on a minimum supplied Vpp signal of 0.5 V. This excess supply voltage is judiciously used herein.

Study of the high speed optical tilted charge device has indicated that restriction of the device's optical bandwidth is strongly influenced by a frequency dependent shorting path in parallel with the base recombination region that diverts recombination current away from the base recombination region at higher frequencies. This results in reduction of light input as frequency increases.

In an embodiment hereof, this loss of recombination current at high frequency is compensated by increasing the input signal voltage strength generally proportionately to the loss due to the shorting path. The required additional signal voltage strength is derived from excess supply voltage that is generated as described herein. In another embodiment hereof, the input signal voltage strength is controlled to compensate for the loss of optical bandwidth along an entire optical link, including, for example, transmitter elements, an optical waveguide, and receiver elements. Again, the necessary additional energy is derived from the excess supply voltage.

Figure 1:
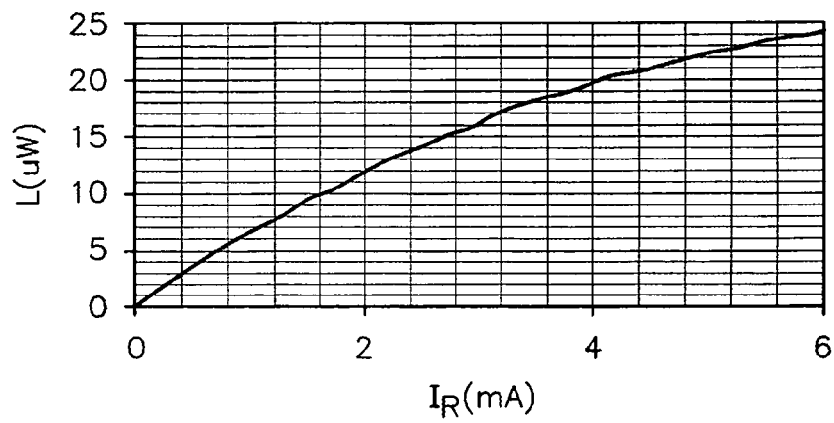
FIG. 1 is a graph of light output (L) vs recombination current ($I_R$) for an optical tilted charge device with an active emitter mesa region of approximately 20 um by 4 um. The slope of L-$I_R$ curve at the bias point, $I_R$~0 mA represents a reference point for the highest internal quantum efficiency achievable by this specific device design.
Figure 2:
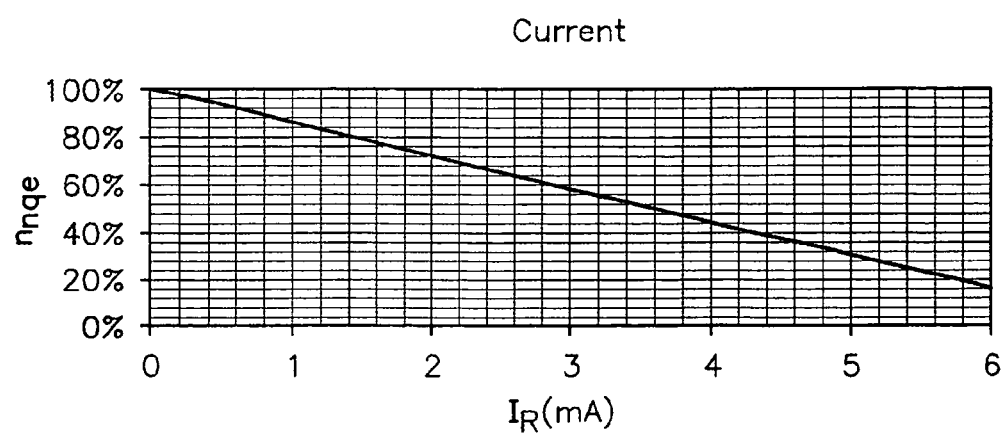
FIG. 2 is a graph of normalized quantum efficiency ($\eta_{nqe}$) vs recombination current ($I_R$) for light emitting transistor with an active emitter mesa region of approximately 20 um by 4 um.
Figure 3:
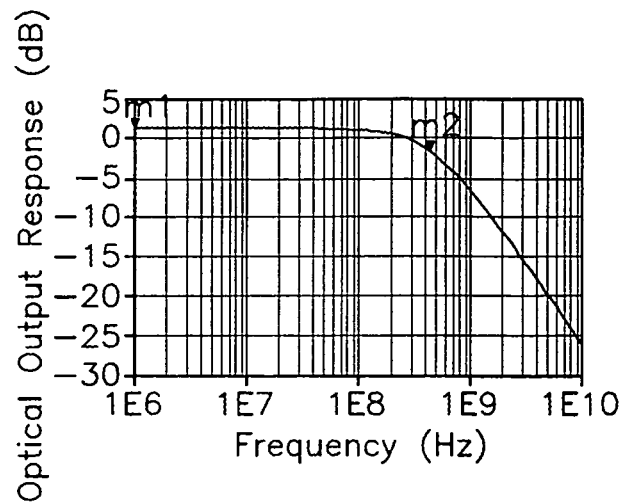
FIG. 3 is a graph of the existing HS-OTCD operating bandwidth response at 5 mA emitter current input. The point m1 is at a frequency of 1.0000 MHz at an optical output response of 1.449 dB, and the point m2 is at a frequency of 439.0 MHz at an output response of −1.551 dB. The 3 dB bandwidth is approximately 439 MHz.

Initially, consider the optical operating bandwidth response of an existing HS-OTCD in the form of a light emitting transistor with a quantum well in its highly doped base region and with an active emitter mesa dimensions of ~20 um by 4 um, biased at 5 mA emitter current input, under common emitter mode. At $I_E$=5 mA (~2 mA recombination current), the approximate averaged active emitter current density is 6250 A/cm² and normalized quantum efficiency, $\eta_{nqe}$ is ~70%. FIG. 3 shows that the device has a 3 dB bandwidth of approximately 439 Mhz, which is much lower than the required minimum for a desired 5 GHz bandwidth for 10 Gbps operation. Furthermore, although the device consumes only ~7.5 mW of power, the power to bandwidth ratio, $r_{pb}$, of ~17 mW/Ghz is actually too high, considering the previously described criteria.

In embodiments hereof, the S-parameters and optical responses are extracted from the HS-OTCD or optical link. Then, the shorting path strength or optical link losses as a function of frequency are identified. Then, a customized digital signal processing (DSP) circuit is devised and coupled to the HS-OTCD device, and enables the utilization of the excess supply voltage to counter the losses as a function of frequency.

Figure 4:
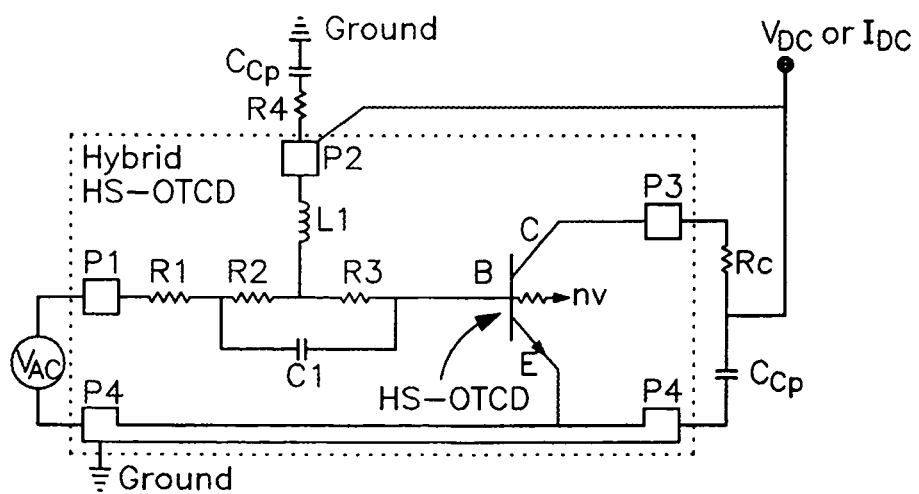
FIG. 4 is a circuit diagram of a hybrid HS-OTCD in accordance with an embodiment of the invention and which can be in practicing embodiments of the method of the invention.

An embodiment of the DSP circuitry that regulates the excess peak-to-peak input voltage (Vpp in) is shown in FIG. 4. In this embodiment, the circuitry comprises a passive RLC configuration with input resistor R1 coupled with resistors R2 and R3 that are in parallel with a capacitor C1. A terminal point between resistors R2 and R3 is coupled via inductor L1, variable resistor R4, and coupling (DC blocking) capacitor $C_{cp}$, to AC ground. The specially regulated output peak-to-peak voltage, $V_{pp}$out, is coupled, in the present embodiment, to the base region (B) of an HS-OTCD, which, in this case, is a light-emitting transistor (LET) having one or more quantum size regions in its heavily doped base region (reference can be made, for example, to the above-referenced patent documents in the Background portion hereof). For this configuration, the emitter region (E) is grounded, and the collector region is coupled, via terminal pad P3 and resistor Rc to bias voltage $V_{DC}$ or current $I_{DC}$. Another coupling (DC blocking) capacitor $C_{cp}$ provides an AC coupling to ground terminal pad P4. In operation, the DC voltage or DC current is applied to turn on the HS-OTCD. An AC signal (typically, a digital signal) is applied via pad P1 to modulate the device's optical output, hv. In one example, R1, R2, R3 and R4 are, respectively, 3 ohms, 35 ohms, 85 ohms, and 8 ohms, C1 is 0.9 picofarads, and L1 is 0.99 nanohenries. A 4.25 Gbps signal is applied to the circuit, and the resulting modulated optical output is measured using a 2.5 GHz bandwidth PIN-TIA/LA photo receiver that is also coupled to a digital oscilloscope. A resulting eye diagram indicated successful digital transmission at 4.25 Gbps.

Figure 5A:
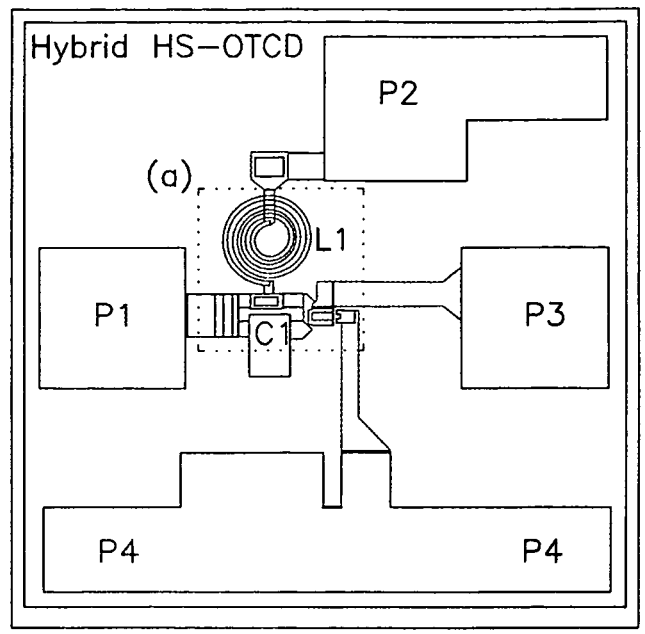
FIG. 5A is a top photographic view of the hybrid HS-OTCD of FIG. 4 integrated on a chip. Variable resistor R4 is placed externally for fine tuning.
Figure 5B:
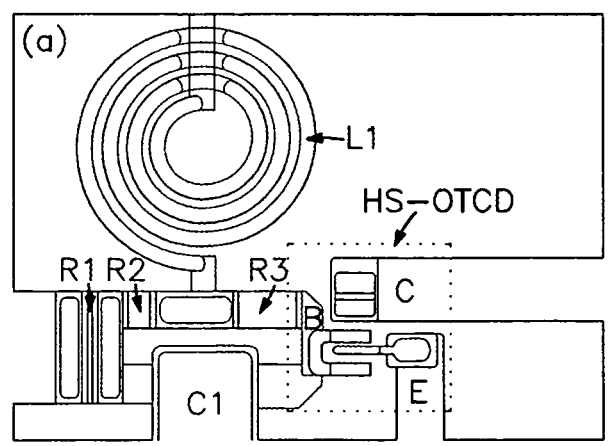
FIG. 5B is an enlargement of inset (a) of FIG. 5A.
Figure 6:
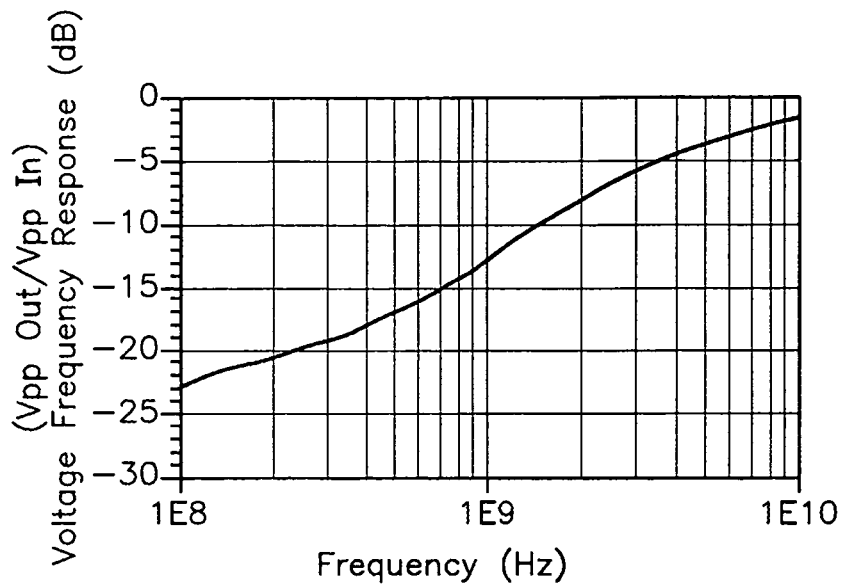
FIG. 6 is a graph of the output voltage frequency response of the DSP of FIG. 5, showing that the DSP enables the excess voltage to be utilized at higher frequency.

FIG. 5A is a top photographic view of the hybrid circuit in the dashed rectangular portion of the FIG. 4 circuit diagram. FIG. 5B is an enlargement of the portion of FIG. 5A in inset (a) thereof. The digital signal processor input circuit is integrated on-chip with the HS-OTCD to form the hybrid HS-OTCD, as shown. The inset (a) in FIG. 5B shows the layout of the passive components (including R1, R2, R3, C1 and L1) and the HS-OTCD of the FIG. 4 circuit. In this embodiment, the variable resistor R4 is external to enable fine tuning capability of the DSP transfer function. When biased with a base current of less than 2 mA, and without the DSP hereof, the HS-OTCD exhibits an optical bandwidth of less than 600 MHz. However, when combined with the DSP, the resulting hybrid HS-OTCD exhibits an optical bandwidth of over 5 GHz, an improvement of about an order of magnitude. The excess supply voltage regulator frequency response (DSP) is shown in FIG. 6. From the Figure, it can be seen that DSP enables the excess voltage to be utilized at higher frequencies to offset the loss due to the shorting path.

Figure 7:
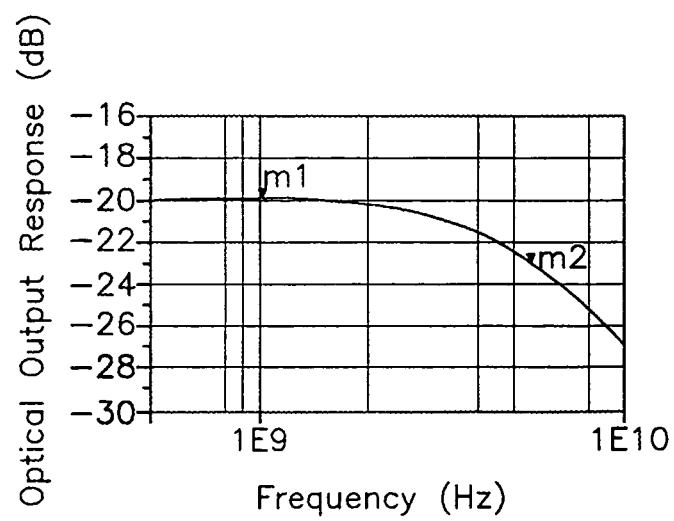
FIG. 7 is a graph showing the optical frequency response of a HS-OTCD coupled with an input DSP circuit that enables the utilization of excess signal voltages at higher frequency. This allows the operating bandwidth to be increased from 439 MHz to 5.6 GHz with approximately no increase in power consumption. The point m1 is at a frequency of 1.006 GHz and an optical output of −19.869 dB, and the point m2 is at a frequency of 5.588 GHz and an optical output of −22.855 dB.

FIG. 7 shows further that by utilizing the excess Vpp at high frequency to compensate for losses due to the frequency dependent shorting path, the operating bandwidth of the HS-OTCD increases from 439 MHz to about 5.6 GHz (~13 times improvement) without consuming additional power (power consumption is fixed at ~7.5 mW). Therefore, the power-to-bandwidth ratio is reduced from 17 mW/GHz to 1.34 mW/Ghz.

Under ordinary circumstances, the use of added external circuitry (e.g. DSP circuitry) for any purpose could present a number of challenges. First, it would introduce coupling complications related the inconsistency due to manufacturing variables (device specification tolerance, offset, solders joints, yield etc). Second, it could add testing cost as the device high speed performance can only be tested once the DSP and HS-OTCD are coupled together. Third, it can add component and inventory costs. These factors might normally contribute to a much higher cost high speed light emitter assembly. In embodiments hereof, however, the on-chip integration of the DSP and HS-OTCD to form a hybrid HS-OTCD eliminates the indicated manufacturing and cost problems. An enabling aspect of this integration is the use of HBT foundry compatible process and components for the DSP functions. The hybrid design is further enabled when the DSP is constructed utilizing only passive components as was shown in FIGS. 4 and 5. A DC voltage regulator can also be advantageously embedded in the hybrid HS-OTCD chip.

Another embodiment of the invention utilizes phase effects to achieve even further improvement of operational bandwidth. In an AC system, relative phase plays an important role in determining various aspect of the system, including stability. By manipulating the phase aspect of the system, effects can be introduced including resonance effects (where phase of superposition waves are exactly identical or 180 degree out of phase). Certain components, such as capacitor and inductor, when biased with identical inputs, produce relative outputs that are naturally 180 degree out of phase relative to each other (e.g. when put in series, the voltage output of a capacitor and inductor are 180 degree out of phase). In some systems, delays can be introduced in a path so that the arriving signal phase has been shifted by, for example, 180 degree. For example, the phase effect implementation can comprise adding an inductor to an existing capacitor in series (see FIG. 8). Resonance frequency occurs when the inductor and capacitor magnitudes are equal. However, because their phases are 180 degree out of phase relative to each other, the inductor and capacitor effects cancels each other out resulting in impedance at its minimum and current at its maximum.

Figure 8:
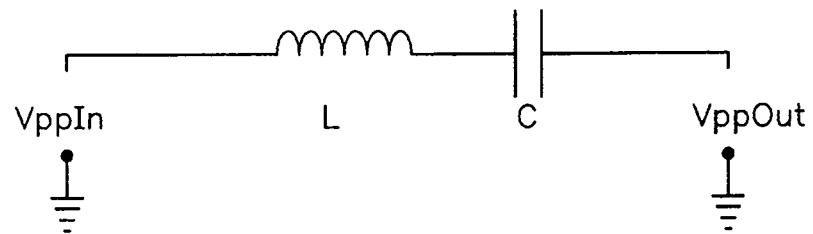
FIG. 8 shows a circuit utilizing phase effects to induce resonance at 7.257 GHz. At 7.257 GHz, the impedance is at minimum (2.2 ohm) and the current across the branch is at its maximum.
Figure 9:
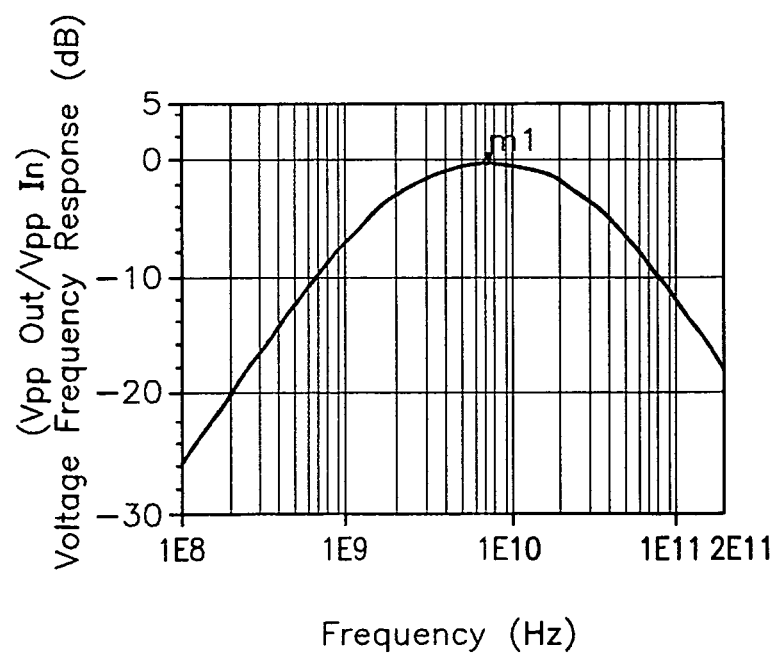
FIG. 9 is a graph of the voltage transfer function of a phase effect circuit designed to induce resonance at 7.257 GHz.

In the example of FIG. 8 the inductor L has an inductance of 0.6 nanohenries and a resistance component of 2.2 ohms, and the capacitor C has a capacitance of 0.8 picofarads. This circuit utilizes phase effects to induce resonance at 7.257 GHz. At 7.257 GHz, the impedance is at minimum (2.2 ohms) and the current across the branch is at its maximum. This is seen in FIG. 9, which shows the voltage transfer function of the FIG. 8 circuit, with m1 designating the maximum frequency response, which occurs at a frequency of 7.257 GHz.

Figure 10:
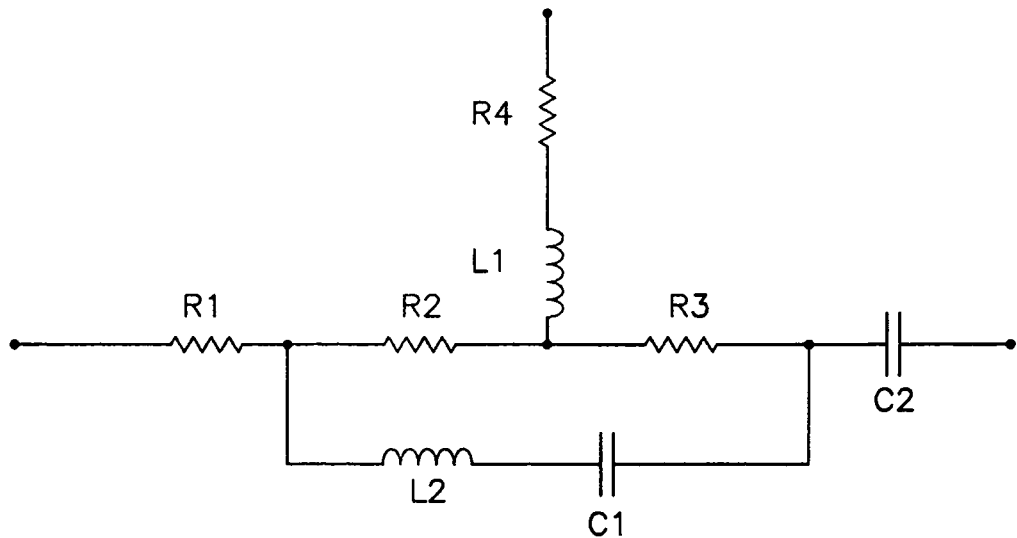
FIG. 10 is a circuit diagram of a phase effect enhanced DSP in accordance with an embodiment of the invention and which can be used in practicing embodiments of the method of the invention.

FIG. 10 shows a portion of the circuit of FIG. 4, modified to incorporate phase effect as in FIG. 8. Specifically, the inductor L2 is put in series with capacitor C1. In an example of this circuit, R1, R2, R3 and R4 are, respectively, 3 ohms, 38 ohms, 50 ohms, and 6 ohms, L1 is 1.6 nanohenries with a resistive component of 3 ohms, L2 is 0.6 nanohenries with a resistive component of 2.2 ohms, and C1 is 0.8 picofarads. Also, coupling capacitor C2 is 17.2 picofarads.

Figure 11:
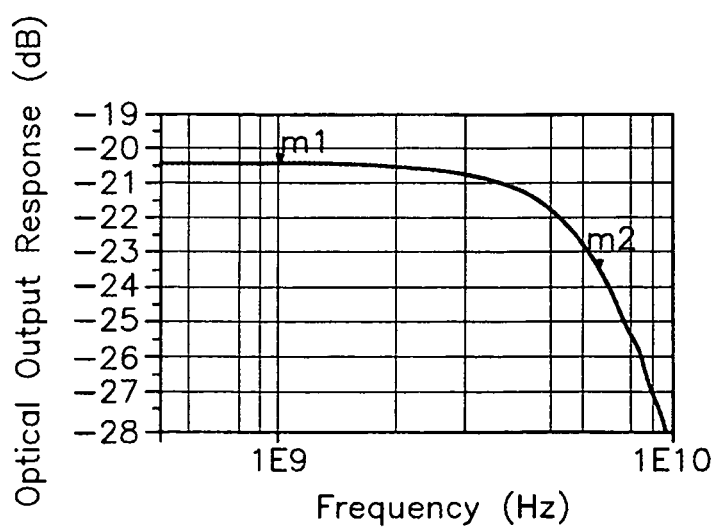
FIG. 11 is a graph of optical power response as a function of frequency for the circuit of FIG. 10, showing that the operating bandwidth of the HS-OTCD is enhanced to 6.5 GHz when the phase effects enhanced DSP is coupled to the HS-OTCD.

FIG. 11 shows that the resonance effect at 7.257 GHz (reference FIG. 9) enhances the operating bandwidth from 5.6 GHz to about 6.5 GHz. Specifically, in FIG. 11 the point ml is at a frequency of 1.006 GHz at an optical power response of −20.33 dB and the point m2 at an optical power response of −23.33 dB (that is, 3 dB down), is at a frequency of 6.523 GHz. An open eye diagram of the phase effect enhanced hybrid HS-OTCD of this embodiment indicated successful operation at 10 Gbps.

Figure 12:
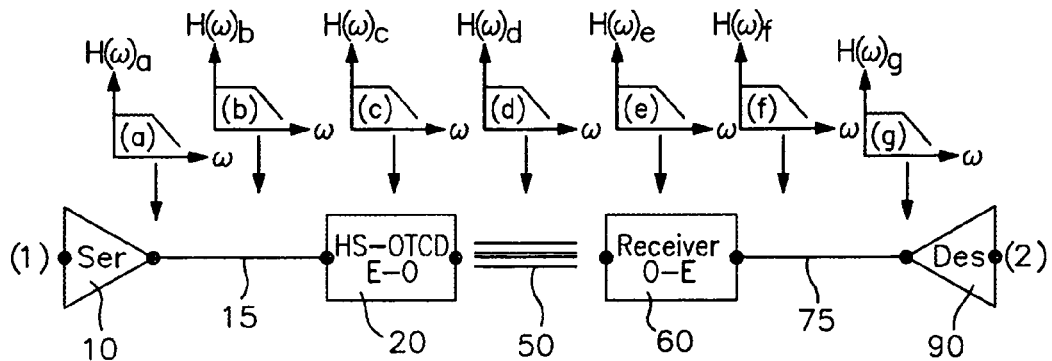
FIG. 12 is a block diagram of a digital transmission link that includes a high speed optical tilted charge device (HS-OTCD).

In a further embodiment hereof, the transfer function of the input interface circuit takes into account the frequency dependent characteristic of some or all of an entire optical link. FIG. 12 shows a digital transmission link that includes a serializer (electrical digital signal transmitter) 10, a transmitter-subsystem transmission line 15, a high speed optical tilted charge device (HS-OTCD) 20 for producing the modulated optical signal for transmission, a fiber optical waveguide 50, an electro-optical receiver 60, a receiver-subsystem transmission line 75, and a deserializer (electrical digital signal receiver) 90. Transfer functions for the link components, in the frequency domain, are sketched (in generalized form) above the link components. These transfer functions are as follows:

$H(\omega)_a$=serializer transfer function
$H(\omega)_b$=transmitter transmission line transfer function
$H(\omega)_c$=high speed optical tilted charge device transfer function
$H(\omega)_d$=fiber optic/waveguide transfer function
$H(\omega)_e$=optical-to-electrical receiver transfer function
$H(\omega)_f$=receiver transmission line transfer function
$H(\omega)_g$=total link transfer function
$H(\omega)_g = [H(\omega)_a] [H(\omega)_b] [H(\omega)_c] [H(\omega)_d] [H(\omega)_e] [H(\omega)_f]$
The total link transfer function, $H(\omega)_g$, is the link transfer function up to the input to the receiver deserializer 90.

Figure 13:
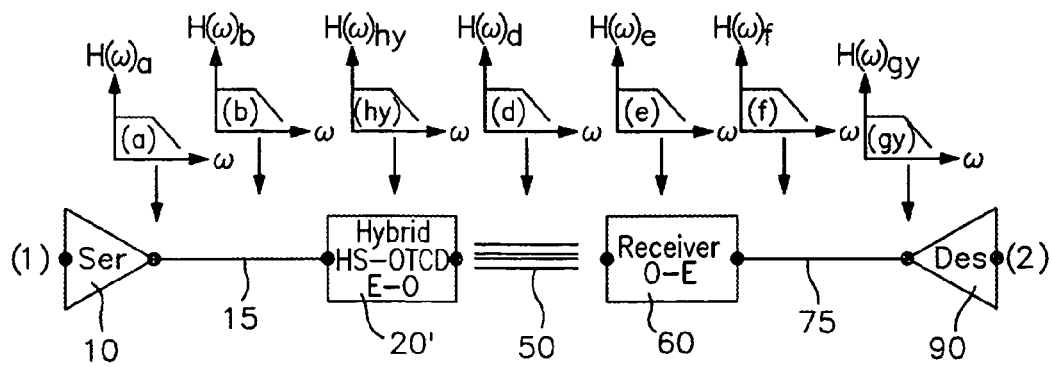
FIG. 13 is a block diagram of the digital transmission link of FIG. 12, modified for utilization with a hybrid HS-OTCD.

In accordance with a form of this embodiment, the hybrid HS-OTCD incorporates an input interface circuit with a transfer function, $H(\omega)_h$, and S-parameter characteristics where this interface circuit transfer function is substantially proportional to the inverse transfer function of the $H(\omega)_g$. (that is, $H(\omega)_h \propto 1/H(\omega)_g$). When coupled with the transfer function of the HS-OTCD, $H(\omega)_c$, this results in a new total link transfer function, $H(\omega)_{gy}$, with a 3 dB frequency bandwidth of at least half the data rate at the largest possible 3 dB frequency magnitude. This will provide the substantial replication, at output point (2), of the digital signal at input point (1). This is represented in FIG. 13, where all components, except the HS-OTCD, correspond to those in FIG. 12 and have like reference numerals. In FIG. 13, however, the HS-OTCD is a hybrid HS-OTCD, as described herein, and is labeled 20'. As above indicated:
hybrid HS-OTCD transfer function, $H(\omega)_{hy} = [H(\omega)_c] [H(\omega)_h]$
where, $H(\omega)_h \propto 1/H(\omega)_g$
Then, the total link transfer function, $H(\omega)_{gy}$ is:
$H(\omega)_{gy} = [H(\omega)_a] [H(\omega)_b] [H(\omega)_{hy}] [H(\omega)_d] [H(\omega)_e] [H(\omega)_f]$
The transfer functions for the link components, in the frequency domain, are again sketched (in generalized form) above the link components. It will be understood that if transfer characteristics of part of the total link are unavailable or will be subject to different or variable parameters, the hybrid HS-OTCD can be designed to have an inverse transfer function that takes account of the known or desired components of the total link.

The invention claimed is:

1. A hybrid circuit for producing optical signals in response to electrical energizing signals, comprising:
    a tilted charge light-emitting device having an electrical input port and an optical output port, said device having an optical output response which is a function of input frequency; and
    an input interface circuit coupled with the electrical input port of said device, and having a transfer function substantially proportional to an inverse of the optical output response of said device, said input interface circuit comprising an RLC circuit having a transfer function characterized by a region of increasing amplitude versus frequency;
    whereby application of said electrical energizing signals to said input interface circuit is operative to produce optical signals from the output optical port of said device.

2. The hybrid circuit as defined by claim 1, wherein said RLC circuit comprises a passive RLC circuit.

3. The hybrid circuit as defined by claim 1, further comprising an integrated circuit medium, and wherein said tilted charge light-emitting device and said input interface circuit are disposed on said medium.

4. The hybrid circuit as defined by claim 1, wherein said input interface circuit comprises a digital signal processor.

5. The hybrid circuit as defined by claim 3, wherein said input interface circuit comprises a digital signal processor.

6. The hybrid circuit as defined by claim 1, wherein said tilted charge light-emitting device comprises a tilted charge light-emitting diode.

7. The hybrid circuit as defined by claim 1, wherein said tilted charge light-emitting device comprises a light-emitting transistor having a second electrical input port.

8. The hybrid circuit as defined by claim 1, wherein said tilted charge light-emitting device comprises a transistor laser having a second electrical input port.

9. A hybrid integrated circuit for producing optical signals in response to electrical energizing signals, comprising:
    an integrated circuit medium;
    a tilted charge light-emitting device disposed on said medium, said device having an electrical input port and an optical output port;
    an input interface circuit disposed on said medium and having a transfer function that is related to an optical response characteristic of said tilted charge light-emitting device, said input interface circuit comprising an RLC circuit having a transfer function characterized by a region of increasing amplitude versus frequency;
    whereby application of said electrical energizing signals to said input interface circuit is operative to produce optical signals from the output optical port of said device.

10. The hybrid circuit as defined by claim 9, wherein said RLC circuit comprises a passive RLC circuit.

11. The hybrid circuit as defined by claim 9, wherein said input interface circuit comprises a digital signal processor.

12. The hybrid circuit as defined by claim 9, wherein said tilted charge light-emitting device comprises a tilted charge light-emitting diode.

13. The hybrid circuit as defined by claim 9, wherein said tilted charge light-emitting device comprises a light-emitting transistor having a second electrical input port.

14. The hybrid circuit as defined by claim 9, wherein said tilted charge light-emitting device comprises a transistor laser having a second electrical input port.

15. A method for producing optical signals in response to electrical energizing signals, comprising the steps of:
provided a tilted charge light-emitting device having an electrical input port and an optical output port;
determining the optical output response of said device as a function of input frequency;
providing an input interface circuit, coupled with said electrical input port, having a transfer function inversely proportional to said determined response; and
applying said electrical energizing signals to said device via said input interface circuit to produce said output optical signals;
wherein said electrical energizing signals comprise AC signals having an excess input voltage peak-to-peak amplitude, and wherein said input interface circuit is operative to use a substantial portion of said excess input voltage.

16. The method as defined by claim 15, wherein said step of providing an input interface comprises providing an RLC circuit.

17. The method as defined by claim 16, further comprising providing said RLC circuit with a series LC branch that is operative to implement a phase shift to said electrical energizing signals.

18. A method for producing optical signals in response to electrical energizing signals, comprising the steps of:
providing a tilted charge light-emitting device having an electrical input port and an optical output port, said device having an optical output response which is a function of input frequency;
providing an input interface circuit coupled with the electrical input port of said device, and having a transfer function substantially proportional to an inverse of the optical output response of said device, said input interface circuit comprising an RLC circuit having a transfer function characterized by a region of increasing amplitude versus frequency; and
applying said electrical energizing signals to said input interface circuit to produce optical signals from the output optical port of said device.

19. The method as defined by claim 18, wherein said electrical energizing signals comprise AC signals having an excess input voltage peak-to-peak amplitude, and wherein said input interface circuit is operative to use a substantial portion of said excess input voltage.

20. The method as defined by claim 18, wherein said step of providing a tilted charge light-emitting device comprises providing a tilted charge light-emitting diode.

21. The method as defined by claim 18, wherein said step of providing a tilted charge light-emitting device comprises providing a light-emitting transistor having a second electrical input port.

22. The method as defined by claim 18, wherein said step of providing a tilted charge light-emitting device comprises providing a transistor laser having a second electrical input port.

* * * * *